United States Patent [19]

Ellenrieder et al.

[11] Patent Number: 4,826,317
[45] Date of Patent: May 2, 1989

[54] SPLIT-IMAGE OPTICAL SYSTEM FOR THE OBSERVATION OF SURFACE STRUCTURES

[75] Inventors: Peter Ellenrieder, Überlingen-Nussdorf; Hans F. Oppelt, Überlingen, both of Fed. Rep. of Germany

[73] Assignee: Bodenseewerk Geratetechnik, Überlingen/Bodensee, Fed. Rep. of Germany

[21] Appl. No.: 148,778

[22] Filed: Jan. 26, 1988

[30] Foreign Application Priority Data

Jan. 30, 1987 [DE] Fed. Rep. of Germany ....... 3702705

[51] Int. Cl.[4] .................. G01B 11/30; G01N 21/88; G02B 23/24
[52] U.S. Cl. .................................. 356/241; 356/376
[58] Field of Search ................... 356/1, 241, 375, 376

[56] References Cited

U.S. PATENT DOCUMENTS 3,817,619 6/1974 Kawahara ........................ 356/1
4,271,829 6/1981 Heckele ........................... 356/1

FOREIGN PATENT DOCUMENTS 169746 9/1985 Japan ........................... 356/241
29708 2/1986 Japan ........................... 356/376

Primary Examiner—Richard A. Rosenberger
Attorney, Agent, or Firm—Lee & Smith

[57] ABSTRACT

For observation of structures, for example of welding seams, within a cavity body, an optical system is provided, which is adapted to be introduced into the cavity body through an opening of reduced diameter. This optical system comprises two boroscopes having parallel shafts and bent off heads for illumination and observation. In a first position the heads are located antiparallel side-by-side and permit the introduction of the optical system through the opening. In a second position the heads are spread and form a base distance in the hollow body to illuminated the structure to be examined at an angle essentially different from the angle at which this structure is observed.

6 Claims, 3 Drawing Sheets

SPLIT-IMAGE OPTICAL SYSTEM FOR THE OBSERVATION OF SURFACE STRUCTURES

It is the object of the invention to observe structures in a cavity, the interior of which is only accessible through an opening having reduced diameter. Particularly the problem is the examination of welding seams in the interior of such a cavity.

It is known to examine structures, as recesses or elevations, by means of the so-called "split-image" methode. To this end, the structure to be examined is "structuredly" illuminated. For example, an illuminated slit or a grid is imaged at a small angle of incidence upon the structure by an optical system. The illuminated points of impingement of the illumination beam of rays on the structure to be examined is observed at an angle of reflection substantially different from the angle of incidence. Depth differences of the structure to be examined are then converted into distortions of the slit or grid image in a plane perpendicular to the axis of the path of rays of observation. In this "split-image" methode a sufficiently long base distance has to be provided between the illumination arrangement and the observation arrangement, in order to permit illumination and observation at substantially different angles.

In production engineering the problem arises, to examine welding seams in cavities. Such cavities have often an opening of reduced diameter.

The invention provides an optical system of the type discussed hereinbefore, which is adapted to be introduced into a cavity through an opening having reduced diameter and which is characterized by (a) a first boroscope for generating a structured illumination having a shaft and a bent off head arranged at the end of the shaft,
(b) a second boroscope for the observation having a shaft extending parallel to the shaft of the first boroscope and a bent off head arranged at the end of the shaft, and
(c) a drive for rotating the boroscopes about the axes of the shafts
   from a first position, in which the two heads are arranged side-by-side,
   to a second position, in which the longitudinal axes of the two heads form an angle, such that a base distance sufficient to permit illumination and observation at substantially different angles is provided between illumination and observation means.

Thus, to achieve the above mentioned object, a "split-image" methode is used. To this end, an optical system having two boroscopes for illumination and observation is provided, which, in a "contracted" state, can be introduced into the cavity through the opening and can be "expanded" within the cavity, such that the base distance required for the "split-image" methode is obtained.

Modifications of the invention are subject matter of the sub-claims.

An embodiment of the invention will now be described in greater detail with reference to the accompanying drawings.

Figure 4:
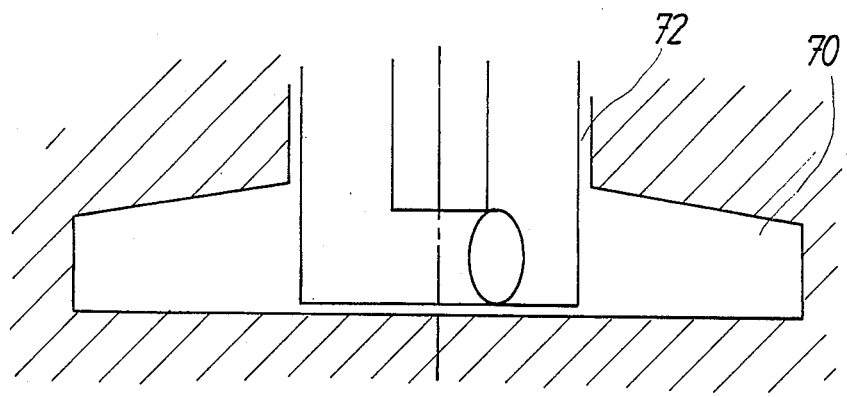
FIG. 4 shows a sectional view taken along the line IV—IV in FIG. 3.
Figure 3:
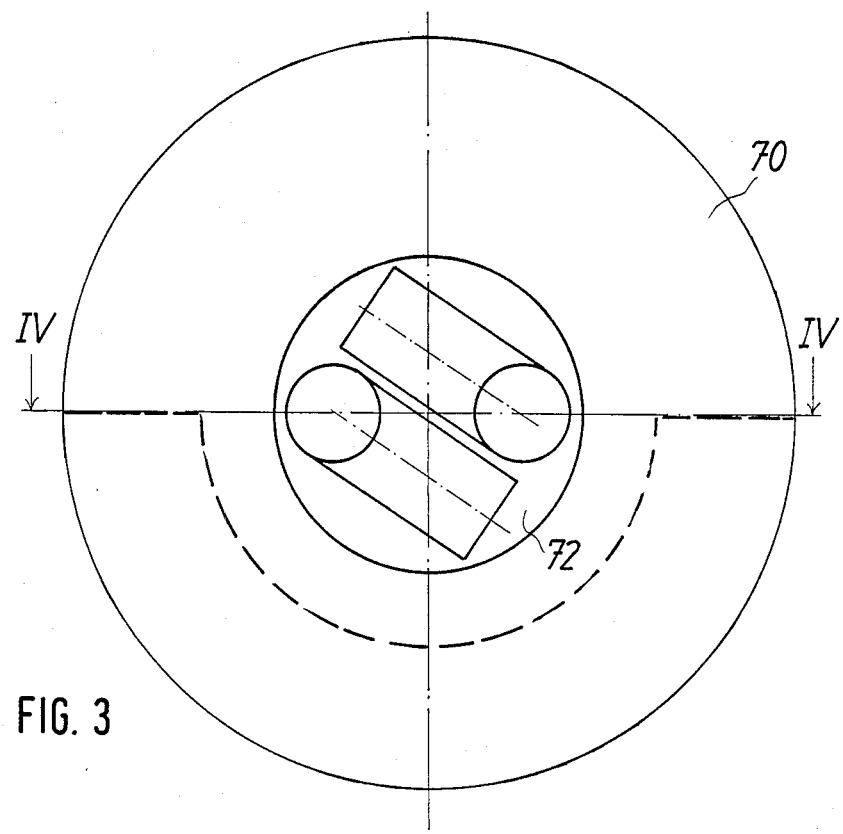
FIG. 3 shows a plan view of a cavity body having an opening of reduced diameter, through which the optical system is introduced in its "contracted" state.
Figure 6:
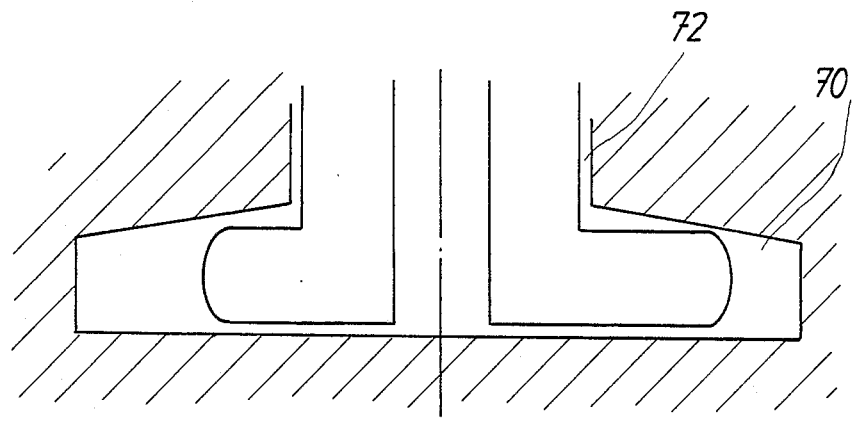
FIG. 6 shows a sectional view taken along the line IV—IV in FIG. 5.
Figure 5:
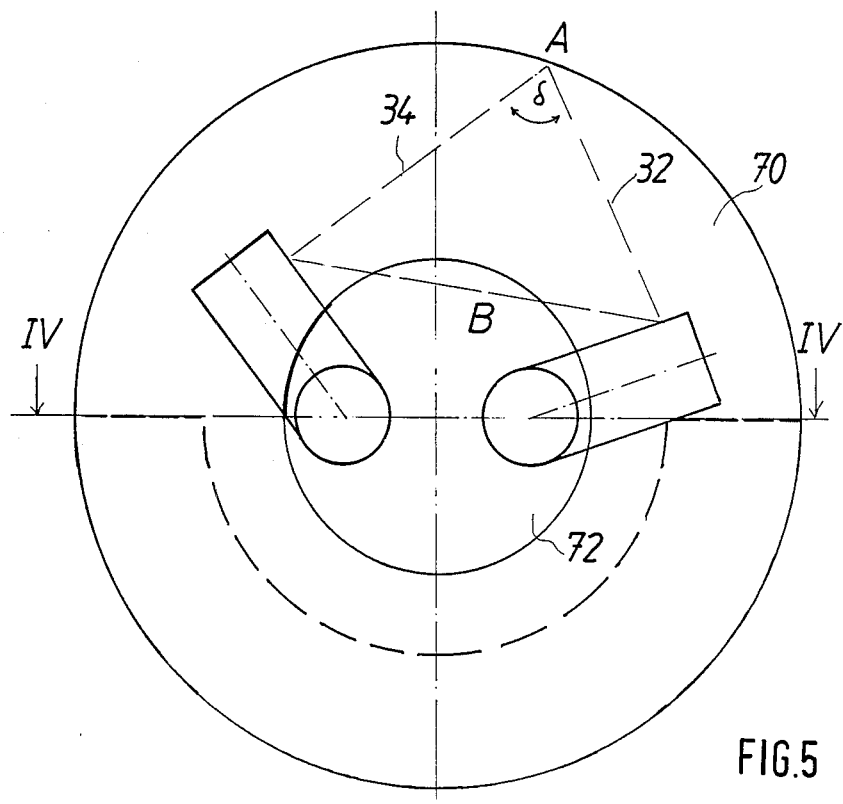
FIG. 5 shows a plan view similar to FIG. 3 with the optical system being "expanded".

The optical system comprises a first boroscope 10 having a shaft 12 and a bent off head 14 arranged at the end of the shaft 12. The optical system furthermore comprises a second boroscope 16 having a shaft 18 and a bent off head 20 arranged at the end of the shaft 18. The shaft 18 of the second boroscope 16 extends spaced from and parallel to the shaft 12 of the first boroscope 10. The two boroscopes are rotatably mounted about the axes of the shafts 12 and 18, respectively, in bearings 22,24 and 26,28, respectively. A drive 30 is arranged to rotate the boroscopes 10 and 16 about the axes of the shafts 12 and 18, respectively, from a first position illustrated in FIGS. 3 and 4, in which the two heads 14 and 20 are arranged antiparallel side-by-side, to a second position, which is illustrated in FIGS. 5 and 6. In this second position the longitudinal axes of the two heads form an obtuse angle, such that a base distance B (FIG. 5) sufficient to permit illumination and observation at substantially different angles is provided.

As can be seen from FIG. 5, the paths of rays of illumination and observation 32 and 34,respectively, pass transversely to the longitudinal axis of the respective head 14 and 20, respectively, through lateral windows 36 and 38, respectively, of the head 14 and 20 respectively. The drive 30 comprises a gear wheel 40 on the shaft 12 of the first boroscope 10 and a gear wheel 42 on the shaft 18 of the second boroscope 16, as well as an intermediate gear wheel 44 between the two gear wheels 40 and 42 and a pinion 46, which is arranged to be driven by a servomotor 48. The two shafts 12 and 18 are rotated in the same direction by the drive 30 from the position of FIG. 3 to the position of FIG. 5.

Figure 2:
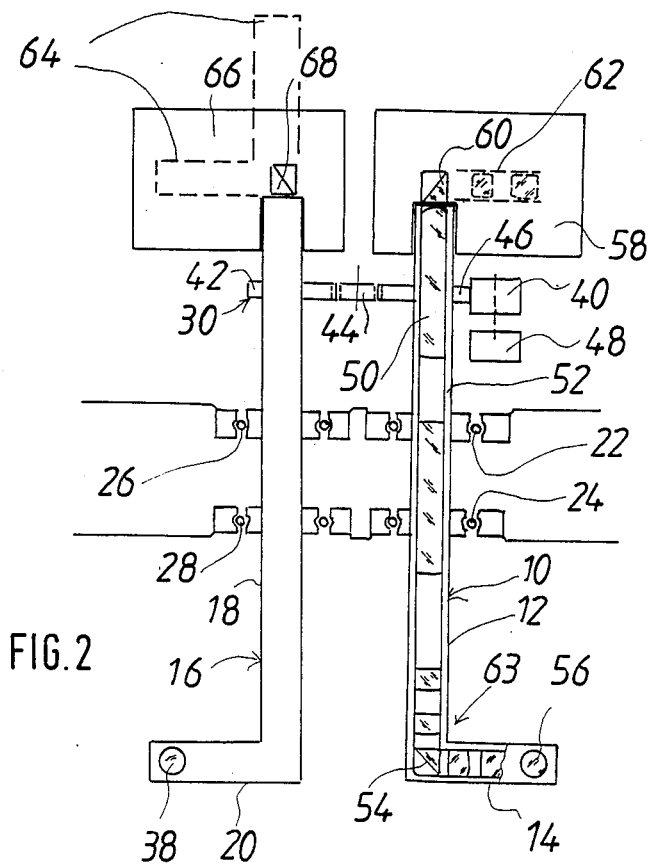
FIG. 2 shows schematically an optical system having a first and a second boroscope for illumination and observation.

As can be seen from FIG. 2, each boroscope 10 and 16 comprises a serie of lenses 50 in a tubular mounting 52. Thereby an object is imaged with several intermediate images through the boroscope 10 and 16 from one end of the boroscope to the other. This is well known to persons skilled in the art and therefore is not described in detail. In the present case, the path of rays is deflected by a deflecting means (prism) 54 from the shaft 12 into the bent off head 14 and from the head 20 into the shaft 18, respectively. A mirror or a prism 56 deflects the path of rays on the side of the head 14 and 20, respectively, transversely to the axis of the head through the window 36 and 38, respectively.

The illumination arrangement (not illustrated in detail) is accommodated in an elongated stationary housing 58. The housing 58 is arranged at the outer end of the shaft 12 of the first boroscope 10 remote from the head 14. The housing 58 extends transverse to the longitudinal axis of the shaft 12. Optical deflecting means 60 in the form of a prism are provided, which are arranged to deflect the path of rays of the illumination arrangement into the shaft 12 of the first boroscope 10. Parts 62 of the imaging optical system are provided in the housing 58. A part of the exit objective 63 is located in the shaft 12. Thereby the length of the head 14 is reduced. This reduces the moment of inertia of the boroscope 10 or 16.

Through the imaging optical system a structured illumination, for example a slit image, is generated at a location A, the structure of which is to be examined. The optical system furthermore comprises a photoelectric detector arrangement 64, which is illustrated schematically in FIG. 1. The detector arrangement 64 is contained in an elongated stationary housing 66. The housing 66 is arranged at the outer end of the shaft 18 of the second boroscope 16 remote from the head 20. The housing 66 is arranged transverse to the longitudinal axis of the shaft 18. Also here optical deflecting means in the form of a prism 68 are provided, which are arranged to deflect the path of rays of the second boroscope 16 to the photoelectric detector arrangement.

The described arrangement operates as follows:

Welding seams are to be examined within a cavity 70, which is only accessible through an opening 72 of reduced diameter. The boroscopes 10 and 16 are, at first, rotated by the servomotor 48 to their first position illustrated in FIG. 3. In this position the two boroscopes 10 and 16 with the heads 14 and 20 form a very compact "contracted" arrangement, which can be introduced into the cavity 70 through the opening 72. Then the optical system is "expanded" by rotating the two boroscopes 10 and 16 clockwise by the servomotor 48 from the position shown in FIG. 3 to the position illustrated in FIG. 5.

In this position a base distance B is provided between the windows 36 and 38. This base distance B is longer than the diameter of the opening 72. A slit image is generated in the path of rays 32 at the location A by the illumination arrangement through the first boroscope 10. This slit image is imaged in the path of rays 34 through the boroscope 16 upon the photoelectric detector arrangement 64. The photoelectric detector arrangement 64 can, for example, be a mosaic detector. The path of rays 32 and 34 form an angle δ.

Figure 1:
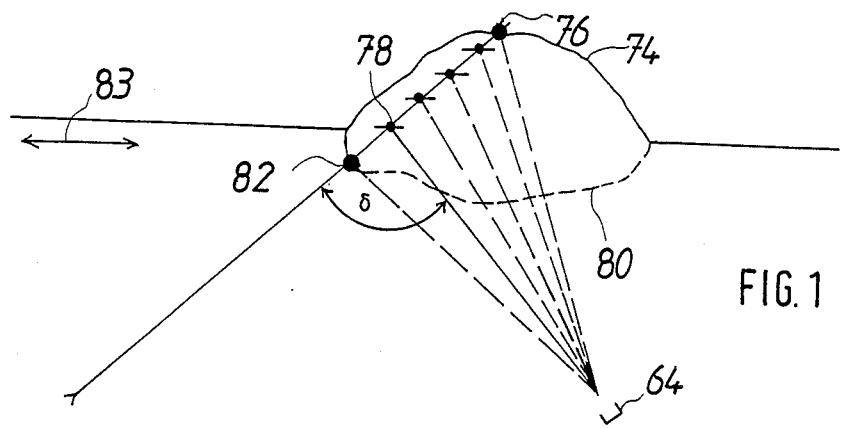
FIG. 1 illustrates the "split-image" methode for observation of elevation structures.

As can be seen from FIG. 1, the angle, at which the photoelectric detector arrangement 64 observes the slit image, is dependent on the position of the surface, on which the path of rays generating the slit image impinges. If a recess 74 is present in the surface, as indicated in FIG. 1, the slit image for the photoelectric detector arrangement 64 will be observed at the location 76. If the surface is plane, the slit image will be observed at the location 78. If a projection 80 is formed at the surface, as indicated by broken lines in FIG. 1, the slit image will be observed at the location 82. In this way by the "split-image" methode the depth variation of the surface strip, on which the slit image is generated, is converted into a two-dimensional distortion of the slit image observed by the detector arrangement 64. By processing the signals from the detector arrangement, this distorted slit image can, for example, be used for examination of a welding seam. The periphery of the cavity 70 is scanned by relative movement of the work piece and the optical system, as indicated by arrow 83 in FIG. 1.

Instead of a photoelectric detector arrangement also some other optical sensor can be used, for example the human eye or a camera.

We claim:

1. Optical system for the examination of surface structures, which is adapted to be introduced into a cavity through an opening (72) having reduced diameter, characterized by
   (a) a first boroscope (10) for generating a structured illumination having a shaft (12) and a bent off head (14) arranged at the end of the shaft (12),
   (b) a second boroscope (16) for the observation having a shaft (18) extending parallel to the shaft (12) of the first boroscope (10) and a bent off head (20) arranged at the end of the shaft (18), and
   (c) a drive (30) for rotating the boroscopes (10,16) about the axes of the shafts (12,18)
       from a first position, in which the two heads (14,20) are arranged side-by-side,
       to a second position, in which the longitudinal axes of the two heads (14,20) form an angle, such that a base distance sufficient to permit illumination and observation at substantially different angles is provided between illumination and observation means.

2. Optical system as set forth in claim 1, characterized in that the paths of rays of illumination and observation (32,34) emerge transversely to the longitudinal axis of the respective head (14,20).

3. Optical system as set forth in claim 2, characterized in that
   (a) the shafts (12,18) of the two boroscopes (10,16) extend spaced from each other, and
   (b) the heads (14,20) of the two boroscopes (10,16) are arranged antiparallel in said first position.

4. Optical system as set forth in claim 3, characterized in that the drive (30) is arranged to rotate the two boroscopes (10,16) in the same direction from the first position to the second position.

5. Optical system as set forth in claim 1, characterized in that
   (a) an illumination arrangement (62) is accommodated in an elongated stationary housing (58), which is arranged at the outer end of the shaft (12) of the first boroscope (10) remote from the head (14), and which extends transverse to the longitudinal axis of the shaft (12), and
   (b) optical deflecting means (60) are provided, which are arranged to deflect the the path of rays of the illumination arrangement into the shaft (12) of the first boroscope (10).

6. Optical system as set forth in claim 5, characterized in that
   (a) a photoelectric detector arrangement (64) is contained in an elongated stationary housing (66), which is arranged at the outer end of the shaft (18) of the second boroscope (16) remote from the head (20), and which extends transverse to the longitudinal axis of the shaft (18), and
   (b) optical deflecting means (68) are provided, which are arranged to deflect the path of rays of the second boroscope (16) to the photoelectric detector arrangement (64).

* * * * *